April 29, 1969  M. D. McCORMICK  3,441,139
MOTOR COOLANT FILTER
Filed Sept. 16, 1966
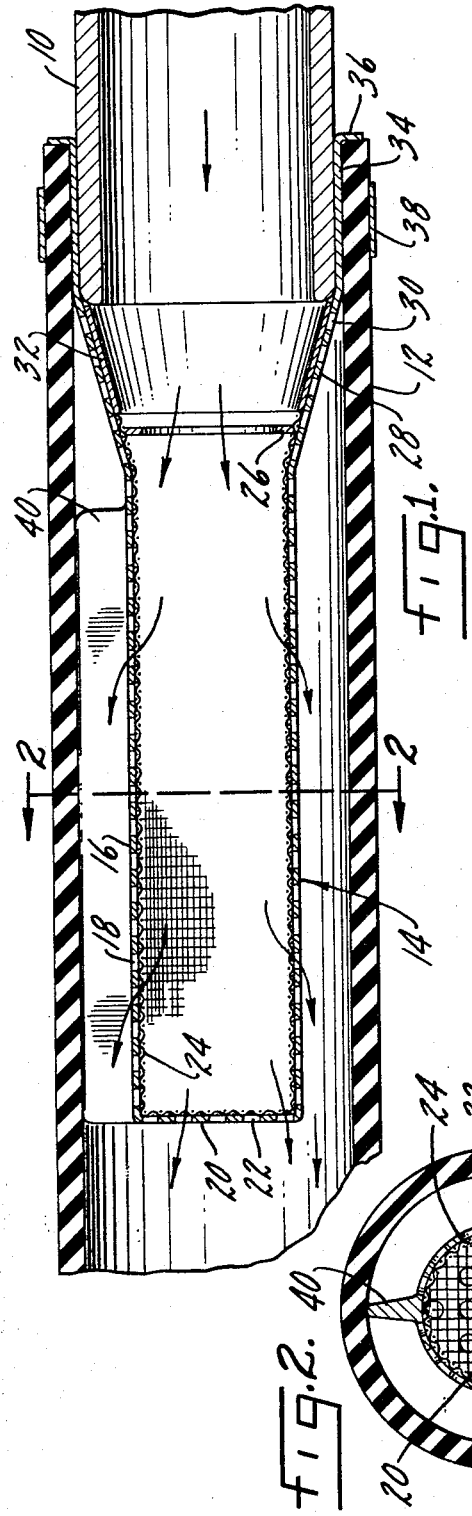
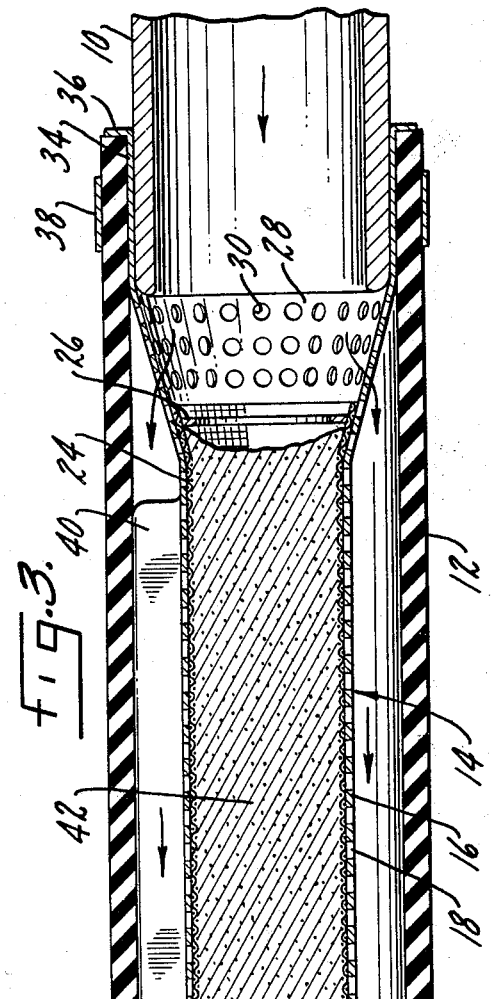
INVENTOR.
Maurice D. McCormick,
BY Parker & Carter
Attorneys.

3,441,139
MOTOR COOLANT FILTER
Maurice D. McCormick, 14 Shady Lane,
Barrington, Ill. 60010
Filed Sept. 16, 1966, Ser. No. 579,965
Int. Cl. B01d 35/14, 27/10
U.S. Cl. 210—149               5 Claims

ABSTRACT OF THE DISCLOSURE

A filter for use in the cooling system of a vehicle having a bypass provided by masking a plurality of openings or perforations with an eutectic substance. In the event of overheating of the water in the cooling system, due to a clogged filter, the eutectic will melt, permitting the coolant to flow through the perforations and bypass the filter.

---

This invention relates to a filter for use in the coolant system of vehicles, and particularly to a coolant filter which has a safety bypass.

A primary purpose of the invention is a coolant filter within a hose line having an eutectic substance covering perforations which are effective to bypass filter, with overheating of the water, caused by clogging in the filter, melting the eutectic substance to permit direct fluid flow around the filter.

Another purpose is a filter of the type described which is reliably operable and simple in construction.

Another purpose is a coolant filter of the type described which has means thereon for centering it within the hose.

Other purposes will appear in the ensuing specification, drawings and claims.

The invention is illustrated diagrammatically in the following drawings wherein:

FIGURE 1 is an axial section through a coolant filter of the type described,

FIGURE 2 is a section along plane 2—2 of FIGURE 1, and

FIGURE 3 is an axial section, similar to FIGURE 1, illustrating the meltable substance in a melted condition, whereby the safety bypass is opened.

All new motors, after assembly and operation, will release core sand, metal particles, core wire sections and other contaminants into the cooling system. These foreign particles greatly deteriorate the water pump, thermostat, radiator, radiator pressure cap, and other parts of the cooling system. Rust buildup also lowers the efficiency of the cooling system. By removal of this material a longer lasting, more efficient cooling system is assured. With a more efficient cooling system it may be possible to use smaller radiators, as well as smaller water passages in the motor block. It also may be possible to reduce the amount of coolant used in the vehicle cooling system.

In FIGURE 1, the outlet of a vehicle motor water supply is indicated at 10 and the vehicle hose line is indicated at 12. The coolant filter of this invention is indicated generally at 14 and may include a generally tubular body portion 16 having perforations 18. The body portion 16 may be a solid member with perforations, as shown, or it may be formed of a wire mesh or the like. Preferably, the end 20 of the body portion 16 is also perforated, as at 22. Positioned within the tubular body portion 16 is a filter or filter media 24 which may be of any suitable type, for example screen, cloth or the like. The filter media 24 is generally continuous over the area of the perforations 16 and 22 so that all perforations are masked by the filter media. The filter media 24 may be contained within the tubular body portion by means of a lock ring or the like 26 which is placed adjacent the entrance to the tubular body portion. Preferably, the lock ring is removable so that the filter media may be replaced when it becomes clogged or worn or when the coolant system is backwashed.

Adjacent the tubular body portion is an entrance portion 28 which may be outwardly flared, beginning at lock ring 26 or just inside of lock ring 26. The entrance end portion 28 may have perforations 30, with the inside of the outwardly flared entrance portion being covered by a layer of material or baffle 32. Note particularly that the layer 32 masks all of the perforations 30 in the entrance portion. Preferably the layer 32 is formed of an eutectic substance or a material which will melt before the overheated coolant damages the motor and coolant system. Various types of plastic or metal may be satisfactory. At the outside end of the entrance end portion 28 are cylindrically arranged tabs 34 which extend between the interior of the hose 12 and the exterior of the water discharge 10. There may be flanges 36 extending outwardly from the cylindrical tabs 34 and butting against the end of the hose 12 so as to properly position the filter within the hose. A clamp 38 may be positioned on the outside of the hose adjacent the cylindrical tabs 34 so as to clamp and hold the filter within the hose.

Turning to FIGURE 2, the tubular body portion 16 may have a plurality, in this case three, of radially extending fins 40 which are generally equally circumferentially spaced about the tubular body portion so as to properly position the tubular body and locate it within the hose 12. The invention should not be limited to radial fins for centering the filter as there may be other satisfactory means for performing this function.

The meltable substance or eutectic substance 32 is important. Note that it masks the perforations 30 and in normal operation functions as a baffle to direct water into the tubular filtering portion. There is however no filter covering the perforations 30 so that they form a safety bypass around the filter media 24. In the event the interior of the filter media becomes clogged with residue there would be no passage of fluid or circulation of fluid in the cooling system of the vehicle. The vehicle would quickly overheat. By using an eutectic to cover the bypass perforations 30, in the event the filter becomes clogged, the water in the vehicle coolant system will quickly heat up and melt the substance 32. Once this material has melted, the perforations 30 will then provide a safety bypass around the filter and there will again be continuous circulation of the coolant in the vehicle water cooling system.

FIGURE 3 illustrates the condition of the filter when the substance 32 has been melted. There is free access to the interior of the hose 12 through the perforations 30. Note that the interior of the filter media is completely filled with residue 42 so that the only passage for the water is through the perforations 30 to the exterior of the tubular body portion 16.

The invention should not be limited to any particular material for forming the covering layer 32. For example, most cooling systems are pressurized and the water boils at about 260°–280° F. The systems normally run hot. The invention should not be limited to any particular substance or range of temperatures, as what is important is to protect the cooling system and motor from damage, while providing an effective filtration of coolant.

In like manner, the invention should not be limited to a flared entrance end as other mechanical configurations or designs may be satisfactory providing that there are perforations available which connect the entrance of the filter with the exterior of the tubular portion of the filter.

Whereas the preferred form of the invention has been shown and described herein, it should be realized that

I claim:

1. In a motor coolant filter, a generally tubular body portion having perforations therein for the passage of fluid, a filter media within said body portion and positioned adjacent said perforations so as to filter guid flowing through said perforations, an entrance into said filter media, means for holding said filter media within said tubular body portion, means for mounting said filter within a hose, a section of said tubular body portion adjacent and outside said filter media entrance having perforations therein for passing fluid, an eutectic meltable substance forming a thin layer covering the perforations in said section, the overheating of fluid, caused by blockage of said filter media, melting said eutectic substance to permit direct fluid access to the perforations in said section thereby forming a bypass around said filter media.

2. The structure of claim 1 further characterized in that the section of said tubular body portion adjacent the filter media entrance is outwardly flared, from said tubular body portion, there being perforations substantially continuously over the area of said section.

3. The structure of claim 1 further characterized in that the means for holding said filter media within said tubular body portion include a lock ring positioned at said filter media entrance, said lock ring being removable for replacement of said filter media.

4. The structure of claim 1 further characterized by and including means for centering said tubular body portion within the hose, including a plurality of outwardly directed fins positioned about the exterior of said tubular body portion and having a radial length sufficient to contact the interior surface of the hose.

5. The structure of claim 1 further characterized in that said tubular body portion includes a generally cylindrical portion and an end portion, with said cylindrical portion and said end portion having perforations formed therein.

References Cited

FOREIGN PATENTS 535,234   1/1957   Canada.

REUBEN FRIEDMAN, *Primary Examiner.*

T. A. GRANGER, *Assistant Examiner.*

U.S. Cl. X.R.

210—445, 448